United States Patent [19]

Srinivasan et al.

[11] Patent Number: 5,393,849
[45] Date of Patent: Feb. 28, 1995

[54] CURABLE POLYESTER/POLYAMINO COMPOSITIONS

[75] Inventors: Ramji Srinivasan, Conyers; Ted M. McVay, Stone Mountain; David A. Hutchings, Tucker, all of Ga.

[73] Assignee: Georgia-Pacific Resins, Inc., Atlanta, Ga.

[21] Appl. No.: 137,739

[22] Filed: Oct. 19, 1993

[51] Int. Cl.$^6$ .......................................... C08F 283/04
[52] U.S. Cl. .................................. 525/425; 528/272; 528/288; 528/300; 528/301; 528/302; 528/303; 528/306; 528/332; 528/335; 528/338; 528/339; 528/347; 525/420; 525/437
[58] Field of Search ............... 528/272, 288, 300, 301, 528/302, 303, 306, 332, 335, 338, 339, 347; 525/420, 425, 437

[56] References Cited

U.S. PATENT DOCUMENTS

| | | | |
|---|---|---|---|
| 3,502,602 | 3/1970 | Helm et al. | 525/32.1 |
| 3,878,035 | 4/1975 | Van Gils | 525/425 |
| 3,883,612 | 5/1975 | Pratt et al. | 525/170 |
| 3,911,048 | 10/1975 | Vargiu et al. | 525/40 |
| 4,018,815 | 4/1977 | Vogt et al. | 560/198 |
| 4,048,257 | 9/1977 | Stevenson et al. | 525/31 |
| 4,066,587 | 1/1978 | Mains et al. | 525/40.5 |
| 4,100,120 | 7/1978 | Maekawa et al. | 525/7 |
| 4,148,765 | 4/1979 | Nelson | 525/7 |
| 4,217,435 | 8/1980 | McConnell et al. | 525/425 |
| 4,224,430 | 9/1980 | Maekawa et al. | 526/282 |
| 4,233,432 | 11/1980 | Curtis, Jr. | 528/298 |
| 4,246,367 | 1/1981 | Curtis, Jr. | 525/49 |
| 4,254,254 | 3/1981 | Gilkey et al. | 528/288 |
| 4,320,045 | 3/1982 | Owen et al. | 523/523 |
| 4,373,085 | 2/1983 | Bolze et al. | 528/291 |
| 4,400,500 | 8/1983 | Kelly et al. | 528/345 |
| 4,435,530 | 3/1984 | Hefner, Jr. | 523/512 |
| 4,496,688 | 1/1985 | Hefner et al. | 525/44 |
| 4,528,219 | 7/1985 | Yamada et al. | 428/35 |
| 4,581,093 | 4/1986 | Noyes et al. | 156/307.3 |
| 4,775,597 | 10/1988 | Birkmeyer et al. | 428/481 |
| 4,868,267 | 9/1989 | Bershas et al. | 528/73 |
| 4,874,837 | 10/1989 | Bershas et al. | 528/291 |
| 5,034,450 | 7/1991 | Betz et al. | 524/538 |
| 5,089,544 | 2/1992 | Ross et al. | 523/511 |
| 5,162,401 | 11/1992 | Ross et al. | 523/511 |

OTHER PUBLICATIONS

Makhlouf, "Polyesters, Unsaturated", *Kirk–Othmer Encyclopedia of Chemical Technology*, Wiley & Sons, 3rd edition, vol. 18, pp. 575–594 (1982).

March, *Advanced Organic Chemistry*, 2nd ed., McGraw-Hill Book Company, pp. 704–705, and 1088–1089, 1977.

*Primary Examiner*—Samuel A. Acquah
*Attorney, Agent, or Firm*—Banner, Birch, McKie & Beckett

[57] ABSTRACT

A thermosetting composition comprising the combination of an unsaturated polyester resin and a polyamino compound having a plurality of secondary or primary amino moieties.

21 Claims, No Drawings

CURABLE POLYESTER/POLYAMINO COMPOSITIONS

BACKGROUND OF THE INVENTION

1. Field of the Invention

The present invention relates to a curable (thermosetting) composition prepared by combining an unsaturated polyester resin and a polyamino compound having a plurality of secondary or primary amino moieties. The invention particularly relates to an aqueous, thermosetting composition comprising a mixture of an unsaturated polyester resin having free hydroxyl moieties and a polyamino compound, such as a polyamide, having a plurality of secondary or primary amino moieties.

2. Background

Unsaturated polyester resins are known. Such resins generally are prepared by reacting an ethylenically unsaturated dicarboxylic acid or anhydride with a polyol, typically a glycol. Curable compositions have commonly been prepared from such polyesters by blending them with an unsaturated monomer, often referred to as a reactive solvent or diluent, such as styrene. Exemplary of such technology are the following U.S. Patents: U.S. Pat. No. 3,911,048; U.S. Pat. No. 4,148,765; U.S. Pat. No. 4,233,432 and U.S. Pat. No. 4,246,367.

Aqueous polyamide resins also are known in the art. Such resins are used for example as one component in binder compositions for imparting wet strength to paper. The polyamide resins are commonly prepared by reacting a polyalkylene polyamine such as diethylenetriamine and a dicarboxylic acid such as adipic acid. For example, see Keim U.S. Pat. No. 2,926,154. By themselves these compositions are not thermosetting and in use they typically are crosslinked with epichlorohydrin.

3. Description of Prior Art

U.S. Pat. No. 3,502,602 discloses an organic solvent soluble unsaturated polyesteramide resin having terminal moieties derived from maleic acid. The resin is prepared by reacting a polymeric fatty acid or a branched polycarboxylic acid with a difunctional aminoalcohol (including a mixture of aliamines and diols) and introducing terminal maleic acid groups to react (cap) with free hydroxyl and amino moieties. The composition is thermosetting in the presence of a vinyl compound such as styrene or an acrylate and a free radical forming catalyst, particularly an organic peroxide.

U.S. Pat. No. 3,878,035 discloses a composite article made by treating a polyamide (nylon) cord or fiber with an epoxide, followed by coating the epoxide-treated polyamide with an uncured, unsaturated polyester, and then shaping and curing the coated polyamide. The unsaturated polyester is a liquid and can be made from fumaric or maleic acid and a glycol.

U.S. Pat. No. 4,066,587 describes adding a high melting point polyamide to a thermoplastic polyester to improve its flow and rheological properties.

U.S. Pat. No. 4,217,435 describes a thermoplastic hot melt adhesive made by blending a polyester resin and a polyamide resin. The polyester resin is a solid having a melting point of 90° to 140° C. made by reacting a mixture of dicarboxylic acids containing at least 40 mole % terephthalic acid with the remaining acid(s) selected from a long list of possible acids that includes fumaric and maleic, and a diol. The polyamide is also a solid with a melting point of 50° to 200° C. A nylon is preferred.

U.S. Pat. No. 4,254,254 describes a polyesteramide hot melt adhesive with a melting point of 70° to 140° C. made by reacting terephthalic acid, a 4–12 carbon atom aliphatic dicarboxylic acid, 1,6-hexanediol and 1,6-hexanediamine.

U.S. Pat. No. 4,373,085 discloses an adhesive composition based on certain polyesteramides. The polyesteramides are terpolymers prepared by reacting a dimerized fatty acid, a diamine, diglycolamine and a dicarboxylic acid. The dimerized fatty acids are described as polymerized, unsaturated natural and synthetic monobasic aliphatic acids of 8–22 carbon atoms.

U.S. Pat. No. 4,496,688 discloses preparing an unsaturated polyester or polyesteramide by reacting an unsaturated diacid, such as maleic acid or fumaric acid, with a polyol and/or a polyamine. The composition is cured by mixing the unsaturated polyester/polyesteramide with an ethylenically unsaturated compound such as styrene or an acrylate.

U.S. Pat. No. 4,581,093 discloses a branched hydroxyl-containing polyester resin made by reacting a diol, a triol or higher functional polyol, and dibasic aromatic and aliphatic acids. Thermosetting compositions can be prepared by adding isocyanate crosslinkers or aminoplast resins to the polyester resin.

U.S. Pat. No. 4,528,219 defines a laminated structure which uses a thermoplastic resin adhesive containing both ester and amide groups along its backbone.

U.S. Pat. No. 4,775,597 describes a UV curable composition made by mixing an ethylenically unsaturated compound such as styrene or an acrylate with a liquid adduct of an unsaturated polyester resin and a hydroxyl-containing amine having primary or secondary amino moieties. The unsaturated polyester is made by reacting an unsaturated diacid, such as maleic acid or fumaric acid, with a polyol. Linear polyesters are preferred.

U.S. Pat. No. 5,034,450 describes a thermoplastic molding composition made by blending a polyamide, a polyester elastomer and optionally a filler. The polyamide can be made from saturated or aromatic dicarboxylic acids and a diamine which is preferably a nylon. The polyester is a terpolymer of a diol, a glycol and a diacid.

DETAILED DESCRIPTION

The present invention is directed to a thermosetting composition made by combining a particular unsaturated polyester resin and a polyamino compound having a plurality of primary (—$NH_2$) or secondary (—NHR) amine nitrogens. According to the invention, the unsaturated polyester resin is made by reacting an ethylenically unsaturated carboxylic acid or anhydride thereof having an acid functionality (—COOH) of at least two with an organic polyol itself having a hydroxyl functionality (—OH) of at least two. According to one aspect of the invention, at least one of the unsaturated acid or polyol used to prepare the unsaturated polyester resin should have a functionality of at least three in order to yield a polyester resin structure, likely branched, having a plurality of free hydroxyl moieties. Preferably, the free hydroxyl content of the unsaturated polyester resin is sufficient to make the ultimate thermosetting composition at least water dilutable, and preferably water soluble. An unsaturated polyester resin useful in the present invention often is prepared by reacting an ethylenically unsaturated dicarboxylic acid or anhydride with a trifunctional or higher functional polyol to produce the polyester having free hydroxyl moieties. To prepare the thermosetting composition, the unsaturated polyester then is combined with a polyamino compound having a plurality of primary or secondary amino moieties such as a polyamide generally made by reacting a dicarboxylic acid with a polyamine.

The present invention is based on the discovery that a curable (thermosetting) composition with unexpectedly advantageous properties can be prepared by combining an unsaturated polyester resin, particularly one having free hydroxyl groups so as to make the resin water dilutable, and a polyamino compound having a plurality of secondary and/or primary amino moieties, preferably a water-dilutable or water-soluble polyamide. Crosslinking occurs in the composition of the present invention through reactions between the amino moieties of the polyamino compound and carboxyl moieties and especially sites of unsaturation on the polyester.

The composition of the present invention has utility, for example, as a binder in a variety of applications such as in the manufacture of glass fiber composites including roofing shingles, insulation and the like, and for imparting wet strength properties to paper products. In this latter application, in particular, the binder composition of the invention has an added advantage of rendering the paper repulpable. Also, when used as a binder for making a glass fiber mat, particularly when using the wet laid process, certain compositions, quite surprisingly, exhibit essentially no measurable organic emissions on cure. This characteristic of curable compositions of the present invention makes such compositions environmentally superior to other binders now commercially available for such applications.

The polyester resin component of the present composition is made by reacting an ethylenically unsaturated carboxylic acid or anhydride thereof having an acid functionality of at least two with an organic polyol having a hydroxyl functionality of at least two. In order to leave sufficient free hydroxyl moieties in the unsaturated resin to render the resin water dilutable, at least one of the unsaturated acid or polyol used to prepare the resin generally should have a functionality of at least three. Generally, the unsaturated carboxylic acid will be an α,β-unsaturated dicarboxylic acid such as maleic acid, fumaric acid, maleic anhydride or a mixture of two or more of these compounds. Based on cost considerations, maleic anhydride is presently the unsaturated acid of choice. Other unsaturated polycarboxylic acids, although usually less preferred, also can be used including such dicarboxylic acids as itaconic acid, citraconic acid, and mesaconic acid, as well as the anhydrides of any of these acids (where they exist) and trifunctional or higher functional carboxylic acids such as aconitic acid.

Part of the unsaturated polycarboxylic acid may be replaced with a saturated or aromatic polycarboxylic acid (or an anhydride thereof) or a hydroxy-acid to vary the crosslinking potential and physical properties of the unsaturated polyester resin. Dicarboxylic acids would normally be preferred, including aliphatic acids such as adipic acid, succinic acid, sebacic acid, glutaric acid, azelaic acid and the like, and aromatic acids such as phthalic anhydride, isophthalic acid, terephthalic acid, trimellitic anhydride and the like. Hydroxy-acids would include lactic acid, citric acid, dimethylol propionic acid and the like. Normally, only a minor amount of such saturated or aromatic polycarboxylic acid or hydroxy-acid would be used, if at all, relative to the unsaturated acid. Use of a particular amount of a saturated or aromatic polycarboxylic acid or hydroxy-acid to obtain a desired result will be routine for one skilled in the art and can be optimized using routine experimentation. Nonetheless, preferred unsaturated polyester resins normally are those prepared utilizing predominately the unsaturated polycarboxylic acid or its anhydride as the carboxylic acid ingredient, i.e., being substantially free of saturated or aromatic acid reactant.

If water dilutability, and especially water solubility, is not a major requirement for the ultimate composition, then the polyol can be selected from glycols and other diols such as ethylene glycol, diethylene glycol, triethylene glycol, propylene glycol, normally liquid, low viscosity polyethylene and polypropylene glycols, neopentyl glycol, 1,3-butanediol, 1,4-butanediol, 2,2,4-trimethylpentanediol, cyclohexanedimethanol, bisphenol A, and the like. Polymer polyols also could be used with advantage.

Preferably, the polyester resin is at least water dilutable, and more preferably water soluble. Consequently, in preferred practice a polyol having a hydroxyl functionality of three or greater is reacted with an unsaturated dicarboxylic acid to make the unsaturated polyester. Suitable higher functional polyols include, trimethylolethane, trimethylolpropane, glycerol, pentaerythritol, sorbitol, 1,2,6-hexanetriol, triethanolamine and the like. Low molecular weight, liquid polyesters or polyethers with a plurality of hydroxyl moieties (3 or more), such as glycerine ethoxylates and propoxylates, also can be used. The trifunctional or higher functional polyol can be supplemented with a glycol or other diol, such as those noted above, to vary the physical properties of the unsaturated polyester resin. Determining the level of use of a particular amount of a glycol or other diol to obtain a desired result will be routine for one skilled in the art and can be optimized using routine experimentation.

The polyol used in preparing the polyester resin often has a significant impact on whether the polyester is water-soluble or at least water-dilutable or water-dispersible. As used herein, the terms water-dilutable, water-dispersible and the like refer to the ability to add water to the resin without causing any significant precipitation of solids. Preferably no precipitation of solids occurs on the addition of water to the resin. The resin, or alternatively the ultimate curable composition of the invention, can often exist in the form of a true solution or as a stable dispersion or emulsion. The extent of the water dilutability of the resin or composition is expressed as a percentage. Dilutability of a curable composition or one of its individual components can be measured by adding deionized water to a known volume (mass) of a sample having a 50% solids concentration. By measuring the amount of water needed to cause incipient precipitation, often referred to as the haze point, one can determine the dilutability of the sample using the following formula:

Water Dilutability = 100% × (Mass of Water Added ÷ Mass of Sample)

For example, a 100 gram sample with a solids concentration of 50% which can sustain the addition of 200 grams of water before incipient precipitation would have a water dilutability of 200%. Particularly useful compositions have a dilutability of at least about 100%, preferably in excess of 1000%, more preferably in excess of 10,000% and most preferably are water soluble.

The total amount of acid relative to the polyol used to prepare the unsaturated polyester resin of the present invention varies as a function of the polyol hydroxyl functionality. Generally, one equivalent of carboxylic acid function (—COOH) requires at least about 1 and preferably at least about 1.2 equivalents of hydroxyl function (—OH). To prepare a polyester resin that is at least water dilutable and preferably water soluble, especially when combined with a polyamino compound such as a polyamide, the ratio of hydroxyl mole equivalents to carboxyl mole equivalents often will be at least above about 1.3, and more usually above about 2.0. Indeed, a hydroxyl to carboxyl mole ratio above about 3.5 will often prove desirable for higher (3 or higher) functional polyols.

The upper bound on the hydroxyl to carboxyl equivalent mole ratio is defined in part by the degree of polymerization (e.g., the molecular weight or viscosity) desired for the polyester resin. Most often, the hydroxyl to carboxyl equivalent mole ratio will be between about 1.2 and 5.0. At a large molar excess of the polyol, the adduct will comprise simply a polyol-capped diacid in the presence of free, unreacted polyol. In many applications, such a product mix would not be desirable because it is normally preferred that the polyester have some free carboxyl moieties to offset the alkaline pH of the polyamide resin. Moreover, compositions containing any appreciable quantity of unreacted monomer should be avoided because of the high VOC (Volatile Organic Carbon) emissions likely accompanying its use. Preferably, the resin is essentially free of unreacted monomers.

When using higher poly-functional polyols care must be taken not to use too low a mole ratio of hydroxyl mole equivalents to the carboxyl mole equivalents or the polyester resin may gel (crosslink rather than branch) and not be useful. One way to avoid premature gelation is to limit the extent of the esterification reaction, i.e., limit the conversion of the acid. Care must be exercised is this regard, however, since this results in a lower residual pH in the unsaturated polyester resin which can contribute to undesired resin hydrolysis. Elevated pH conditions, possibly created when a polyester is combined with a normally alkaline polyamide resin, also should be avoided since this similarly causes resin hydrolysis.

When preparing the polyester resin from maleic anhydride and pentaerythritol, for example, a mole ratio of diacid to polyol in the range of about 0.45:1.0 to 0.75:1.0 has proven to be suitable. This corresponds to a ratio of hydroxyl mole equivalents to carboxyl mole equivalents in the range of about 2.7:1 to 4.4:1. At the low end of the diacid to polyol mole ratio range (i.e., the high end of the hydroxyl to carboxyl ratio), the free carboxylic acid functionality of the polyester resin is low (while the free hydroxyl moieties are high) and the primary mode of curing with the polyamino component comprises a reaction between the amino moieties of the polyamino component and the sites of unsaturation on the polyester. At the higher end of the diacid to polyol mole ratio range (i.e., the low end of the hydroxyl to carboxyl ratio), the number of free carboxylic moieties is significantly higher (while the level of free hydroxyl moieties is lower) such that the formation of amide linkages between the polyamino component and the polyester also likely becomes a significant contributor to crosslink formation. Whether one approach is favored over the other depends on the particular circumstances of the end use application, and can readily be evaluated by those skilled in the art.

Further variations in the properties of the unsaturated polyester resin also can be obtained by including monofunctional compounds during the condensation (esterification) reaction. For example, fatty acids of 8 to 22 carbon atoms, benzoic acid, rosin acids, monohydric alcohols having 4 to 12 carbon atoms, benzyl alcohols and resin alcohols can be added, generally, if at all, in small amounts. Again, use of a particular amount of such monofunctional additive to obtain a desired result will be routine for one skilled in the art and can be optimized using routine experimentation. The amount of any added monofunctional compounds should not be sufficient, however, to reduce the average functionality of either the acid or polyol components to a value that would prevent adequate resin reactivity (i.e., retention of crosslinking sites) or interfere with resin water dilutability (i.e., retention of free hydroxyl moieties) when important.

The preparation of the unsaturated polyester resin of the present invention by condensation (esterification) reaction between an unsaturated polycarboxylic acid and a polyol can be conducted using techniques and equipment well known to those skilled in the art. In this regard, reference is made to *Kirk-Othmer Encyclopedia of Chemical Technology*, Vol. 18, 3rd Ed., pp. 575-594 (1982) for suitable procedures, which disclosure is incorporated herein by reference. In particular, the unsaturated resin can be prepared by charging a suitable reaction vessel with the polycarboxylic acid, adding the polyol and heating the mixture such as at a temperature in the range of about 130° to 220° C. for about 3 to 20 hours. Esterification catalysts for increasing the rate of the reaction and for allowing for the use of lower esterification temperatures, such as para-toluenesulfonic acid, lactic acid and the like, optionally can be used, and may prove advantageous in certain applications.

The reactor should be provided with means for removing water generated during the reaction. The reaction is continued until the desired acid number or simple acid titer, and/or the desired viscosity of the product is reached. Acid titer is the amount of 1N sodium hydroxide (measured in milliliters) needed to adjust one gram of polyester resin (mixed with water) to a pH of 7.0. The acid titer and resulting pH of the polyester product will depend upon the diacid to polyol mole ratio used for its preparation and the presence of other functional reactants such as lactic acid. For example, when preparing a polyester resin from maleic anhydride and pentaerythritol at a mole ratio of 0.7:1 a suitable target for the acid titer is about 1 to 1.3. At a higher acid to polyol mole ratio of about 0.9: 1, a higher acid titer target range of 1.5–1.8 has proven to be suitable. When preparing a polyester resin from maleic anhydride and glycerine, a suitable acid titer target is about 0.5 to 1.0; while a polyester resin made from a glycol and maleic anhydride might have an acid titer target of 0 to 0.5. Using lactic acid as an esterification catalyst raises the targeted acid titer by about 0.2 to 0.3 points.

In any event, when preparing a polyester resin using a higher functional polyol the target acid titer should not be too low or the resin may crosslink to a gel.

The initial esterification reaction often is conducted under substantially anhydrous conditions so that the desired extent of the esterification reaction can conveniently be monitored by measuring the amount of water evolved as the reaction proceeds. The presence of any significant amount of water at the outset of the esterification reaction interferes with this method of monitoring the desired end point of the reaction. The present invention is not limited to any particular method for assessing the end point of the esterification reaction, however.

When preparing a resin suitable for aqueous applications, the esterification reaction often is continued until about 90%, often in excess of 95%, of the theoretical amount of water is evolved from the esterification reaction. Other alternative methods for preparing the unsaturated polyester resin component of the present invention will be recognized by those skilled in the art, and the present invention is not limited to any particular way for preparing the resin.

Polyester resins of an average molecular weight of less than about 500 will normally have too low a viscosity to impart to the curable compositions of the present invention a consistency required for satisfactory performance and often will have too high a content of unreacted monomer and will not contain a sufficient level of unsaturation in the polymer backbone for proper cure. Polyester resins having an average molecular weight of higher than about 10,000, although suitable in certain applications, are generally not desired because they tend to be more difficult to prepare in a cost effective manner. Polyester resins suitable for preparing water-dilutable compositions according to the present invention particularly suitable for preparing binders for glass fibers generally have a molecular weight ranging from about 1000 to 4000 and more usually from about 1200 to about 2200 based upon gel permeation chromatography (GPC) in tetrahydrofuran (THF) solvent.

To prepare the curable composition of the present invention, the polyester is combined with a polyamino compound having a plurality, i.e. two or more, primary and/or secondary amino moieties. A wide variety of compounds having primary and/or secondary amino moieties can be used such as polyamide resins, the Jeffamines ® available from Texaco, such as Jeffamine ® T400, polyethylene imines, high molecular weight polyalkylene polyamines, such as tetraethylenepentamine, and the like.

Polyamino compounds useful in the present invention, having a plurality a primary or secondary amino moieties, generally will have the formula:

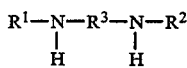

wherein $R^1$ and $R^2$ are independently selected from the group consisting of hydrogen, or aliphatic, cycloaliphatic and aromatic hydrocarbon radicals, the hydrocarbon radicals optionally containing primary or secondary amino moieties; and $R^3$ is a divalent organic radical which can be selected from the group consisting of alkylene, ether-linked alkylene, ether-linked cycloalkylene, ether-linked arylene, amino-linked alkylene, amino-linked cycloalkylene, amino-linked arylene and combinations thereof, optionally containing primary amino groups, secondary amino groups and/or hydroxyl moieties. Suitable polyamino compounds will have a molecular weight of at least about 150, usually at least about 200 and more often above about 300. The amino compounds preferably contains two or more primary amino groups and one or more secondary amino groups.

Due to their low volatility and generally low toxicity, polyamide resins are especially useful as the polyamino compound.

Aqueous polyamide resins particularly useful in preparing curable compositions according to the present invention can be prepared by reacting a dicarboxylic acid or a reactive derivative thereof such as a diester or a dihalide, with an organic polyamine. The reaction is conveniently conducted in aqueous solution. Long-chain, water-soluble (infinitely water dilutable) polyamides can be produced from such dicarboxylic acids and polyalkylene polyamines. Such adducts often have the following recurring groups:

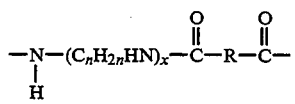

wherein n and x are each 2 or more and R is the divalent organic radical of the dicarboxylic acid (or anhydride) or a reactive derivative, e.g., a diester or acid halide, thereof.

Dicarboxylic acids suitable for preparing polyamides used to produce the curable composition of the present invention include saturated aliphatic dicarboxylic acids, preferably containing from about 3 to 8 carbon atoms such as malonic acid, succinic acid, glutaric acid, adipic acid and the like. Diglycolic acid also can be used as the dicarboxylic acid. Still other dicarboxylic acids will be recognized by those skilled in the art. The dicarboxylic acid normally is selected so that the resulting long-chain polyamide is at least water-dilutable and is preferably water-soluble. For that reason, 4 to 6 carbon atom dicarboxylic acids are preferred. While blends of such dicarboxylic acids can be used, possibly including even longer chain dicarboxlyic acids, the use of adipic acid alone often is preferred.

Dicarboxylic diesters suitable for preparing useful polyamides are the lower alkyl diesters produced by reacting the above-noted $C_3$ to $C_8$ saturated aliphatic dicarboxylic acids with saturated aliphatic monohydric alcohols containing from 1 to 3 carbon atoms, i.e. methanol, ethanol, isopropanol and n-propanol. Methyl and ethyl esters are preferred with the methyl esters being particularly preferred. Exemplary of suitable diesters are dimethyl malonate, diethyl malonate, dimethyl succinate, di-isopropyl succinate, dimethyl glutarate, dimethyl adipate methyl ethyl adipate. Blends of such esters also can be used. Dimethyl adipate and dimethyl glutarate are preferred.

Polyamines useful for producing the polyamide component of the present invention, having a plurality of primary or secondary amino moieties, generally have the formula:

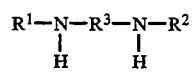

wherein $R^1$ and $R^2$ are independently selected from the group consisting of hydrogen, or aliphatic, cycloaliphatic and aromatic hydrocarbon radicals, or $R^1$ and $R^2$ taken together with the remainder of the molecule form a cycloaliphatic ring, the hydrocarbon radicals or ring compound containing primary or secondary amino moieties; and $R^3$ is a covalent bond or a divalent organic radical selected from the group consisting of alkylene, cycloalkylene, arylene, ether-linked alkylene, ether-linked cycloalkylene, ether-linked arylene, amino-linked alkylene, amino-linked cycloalkylene, amino-linked arylene, and combinations thereof, optionally containing primary amino groups, additional secondary amino groups and/or hydroxyl moieties. These polyamines preferably contain two or more primary amino groups and one or more secondary amino groups.

Suitable polyamines include ethylene diamine, propylene aliamine, hexane-1,6-diamine, 4,4'-methylene bis(-cyclohexylamine), aminoethylpiperazine, diethylenetriamine, triethylenetetramine, tetraethylenepentamine, 3,3-iminobispropylamine and the like.

Particularly useful are the polyalkylene polyamines such as polyethylene polyamines, polypropylene polyamines, polybutylene polyamines and the like. Typically, suitable polyalkylene polyamines contain two primary amine groups and at least one secondary amine group wherein the nitrogen atoms are linked together by groups of the formula —$C_nH_{2n}$— where n is small integer greater than unity and the number of such groups in the molecule ranges from 2 up to 8 and preferably up to about 4. The nitrogen atoms may be attached to adjacent carbon atoms in the group —$C_nH_{2n}$— or to carbon atoms further apart, but should not be attached to the same carbon atom. Specific polyalkylene polyamines suitable for preparing water-soluble polyamides include diethylenetriamine, triethylenetetramine, tetraethylenepentamine, dipropylenetriamine and the like. Still other polyalkylene polyamines will be recognized by those skilled in the art. Based on a variety of considerations diethylenetriamine often is preferred.

It also is possible to use mixtures of such polyamines as well as crude polyamine materials. For example, the crude polyethylene polyamine mixture obtained by removing chlorides, water, excess ammonia and any ethylenediamine from the reaction product of ammonia and ethylene dichloride can be used as the starting polyamine material. The reactivity of the subsequently produced polyamide resin also can be modified by substituting an aliphatic diamine such as ethylenediamine or a heterocyclic aliamine such as piperazine for a portion of the polyalkylene polyamine.

The reaction between the dicarboxylic acid (or anhydride) or the diester or acid halide thereof and the polyalkylene polyamine often is conducted at a temperature of from about 15° C. up to about 250° C. at atmospheric pressure. Generally, when using a dicarboxylic acid, temperatures between about 110° C., and 220° C. are suitable. In such cases, a temperature between about 140° C. and 170° C., generally is preferred. As recognized by those skilled in the art, lower temperatures, e.g. between about 80° and 160° C., may be used when reacting a diester or acid halide of the dicarboxylic acid with the polyamine. The reaction also can be conducted at a subatmospheric pressure in which case a somewhat lower temperature may be used. It is also possible to use a pressurized reactor, although based on considerations of cost and convenience, atmospheric pressure operation is preferred. The reactor generally should be provided with means for removing water generated during the reaction.

Typically, the reaction can be continued until the polyamide product achieves a desired Gardner-Holt viscosity, i.e., generally a Gardner-Holt viscosity of at least about a D and preferably at least about an E, measured at a solids concentration of about 30–35% should be suitable. As recognized by those skilled in the art, Gardner-Holt viscosities can be convened to other measures of viscosity. In this case, a suitable kinematic viscosity for the polyamide product would be about 125 to 140 centistokes. If prepared under essentially anhydrous conditions, water evolved during the preparation of the polyamide also can be used to monitor the progress of its preparation. Although dependent on the reaction temperature and pressure, the time of reaction for preparing a polyamide resin of the desired viscosity may vary between about 0.5 to 20 hours or more. Longer reaction times are required for polyamides prepared at higher molecular weights.

The ratio of the carboxylic acid component to the polyamine component is such that the resulting polyamide has a sufficient number of basic amino groups, i.e., primary and secondary amino moieties, for reaction with the unsaturated polyester in the curable composition.

Generally, sufficient dicarboxylic acid or the diester or acid halide thereof is supplied to react substantially completely with the primary amine groups on the, polyamine, such as the polyalkylene polyamine, but the amount of acid, diester or acid halide is insufficient to react with any secondary amine groups to any substantial extent. Thus, when using a polyamine having two primary amine groups an appropriate mole ratio of polyamine to dicarboxylic acid (or diester or acid halide) will be between about 0.5:1 to about 1.2:1 and often will lie between about 0.7:1 to about 1.14:1. Higher and lower mole ratios may, on particular occasions, be used with acceptable results. Normally, the reaction of polyamides prepared at a diacid-to-polyamine mole ratio significantly below about 0.9:1 with unsaturated polyester resin leads to emissions of aliphatic amines when the ultimate composition is cured; while the reaction of polyamides prepared at a diacid-to-polyamine mole ratio significantly above about 1.2:1 yields products having a lower molecular weight. Resins of lower molecular weight tend not to cure as completely and exhibit poorer strength and durability in boiling water than their higher molecular weight counterparts.

At a mole ratio of diacid to polyamine near about 1:1 and higher, the polyamide predominantly has terminal amino groups with a relatively low ratio of primary to secondary amino moieties. At lower mole ratios, the ratio of primary to secondary amino groups is higher as is the molecular weight of the polyamide resin.

In the reaction of the dicarboxylic acid and the polyamine, a polycondensation catalyst can be used. Preferred catalysts include sulfuric acid, benzenesulfonic acid and p-toluenesulfonic acid. A suitable amount of acid catalyst is generally in a range of 0.005 to 0.10 mole, preferably about 0.01 to 0.05 mole, per mole of the polyamine.

The curable (thermosetting) composition of the present invention is prepared by combining the unsaturated polyester resin and the polyamino compound. Suitable compositions are prepared simply by mixing polyester resin and the polyamino compound at a proportion of polyester resin to polyamino compound (by weight) in the range of about 1:99 to about 99:1 per 100 parts total weight of the composition, more usually in the range of about 10:90 to about 90:10 per 100 parts total of the composition. The selection of a particular proportion of polyester resin and polyamino compound to use in a curable composition depends, inter alia on the relative functionality of the polyester vis-a-vis the polyamino compound. Generally, as will be recognized and understood by those skilled in the art, it is desirable to balance the level (moles) of crosslinking sites on the polyester (carboxyl moieties and ethylenic unsaturation) with the level (moles) of amino moieties. Preferably, when using a polyamide resin as the polyamino compound, the polyester and polyamide resins are provided in a weight proportion of about 30:70 to about 70:30.

Preferred compositions are water-dilutable and more desirably water-soluble. As used herein, the terms "solutions" "soluble" and the like are intended also to include colloidal solutions. Normally, aqueous compositions are prepared having a solids content somewhere between about 20 and 70%. An aqueous composition having a solids content of about 50% may have a viscosity of between about 50 to 500 cps. Aqueous emulsions of the component resin solids are also acceptable. Spray-dried powders of aqueous preparations of the curable composition also are contemplated.

For prolonging storage stability and avoiding hydrolysis of the constituent polymers, the pH of aqueous compositions generally should be maintained between about 5 and about 8. The optimum pH for storing the curable composition will, in large part, be a function of such factors as the respective molecular weights of the polyester resin and the polyamino compound, the level of unsaturation and residual carboxyl functionality in the polyester resin, i.e. the level of available cross-link sites, the level of amino functionality on the polyamino compound, the extent of any pre-curing of the polyester resin and polyamino compound and the like. Generally, the higher reactivity, lower molecular weight species should be stored at a pH below about 7; while lower reactivity, higher molecular weight species tend to more stable at a pH above about 7. An optimum pH for storing a particular curable composition can be identified using routine testing by those skilled in the art. Curable compositions stored at an appropriate pH condition at room temperature have substantially retained their performance and viscosity characteristics for over three (3) months.

The curable composition of the present invention may contain a variety of other additives commonly used in binder compositions including fillers, catalysts, inhibitors, antioxidants, thickening agents, colorants, pigments, lubricants, polymerization initiators and the like.

Curing of the composition of the present invention can be accomplished at temperatures from about 10° to about 200° C. and higher. For example, with some compositions curing at an ambient temperature and below may be effected by adjusting the pH of the composition upwardly over about 8.0. Depending on the particular composition, the temperature and also upon the presence of optional additives, the curing can be completed in as short a period as about 5 seconds to about 60 minutes and higher. At a pH of 7.5, curing can be completed in some compositions in as little as 30 seconds at 150° C.

In some applications, such as when the composition is used as a wet strength resin, it may be advantageous to advance the cure of the composition partially to increase its viscosity prior to use. This generally can be done by a controlled heating of the composition at temperatures in the range of about 30°–40° C. at a pH of between about 7.0 and 8.5 for a time sufficient to advance the composition to the desired viscosity. For example, a 50:50 polyester:polyamide blend containing 20% solids can be heated at such temperatures to advance the curable composition to a viscosity of a Gardener G.

The present invention is illustrated further by the following examples wherein all parts are given by weight (in grams) unless otherwise indicated.

EXAMPLE 1

Preparation of Polyester Resin (506D64)

To a glass reactor of a suitable capacity was added about 878 grams of maleic anhydride, which was heated to 150° C. to melt the maleic anhydride. About 1622 grams of pentaerythritol then were added to provide a maleic anhydride:pentaerythritol mole ratio of 0.75:1. Once the pentaerythritol was melted the temperature was increased to about 200° C. to facilitate the esterification reaction, all the time recovering and measuring the water evolved by the esterification reaction as distillate. Near the end of the resin preparation, vacuum was applied to the reactor. Once about 156 ml of water were recovered (after about 80 minutes elapsed time), the reaction was completed to the desired extent and the polyester product was cooled. About 2500 grams of water was slowly added to the polyester to provide an aqueous resin solution having a solids content of about 50% and to prevent a rapid increase in solution viscosity. The polyester product had a pH of about 2.0, about a 0.5% free acid content and a dilutability of about 100%.

EXAMPLE 2

Preparation of Polyester Resin (492D45)

To a glass reactor were added about 1200 grams of maleic anhydride which was heated to 150° C. to melt the maleic anhydride. About 1110 grams of pentaerythritol then were added to provide a maleic anhydride:pentaerythritol mole ratio of 1.5. The reactor contents were heated to about 160° C. to accelerate the esterification reaction and the esterification reaction was allowed to continue until 150 grams of water were recovered. Then the polyester product was cooled to 120°–150° C. and 2300 grams of water were added. Thereafter, the aqueous polyester was cooled to 25° C.

EXAMPLE 3

Preparation of Polyester Resin (492D36)

To a glass reactor were added about 471 grams of maleic anhydride and about 650 grams of pentaerythritol to provide a maleic anhydride:pentaerythritol mole ratio of 1:1. The reactor contents were heated to about 200° C. to accelerate the esterification reaction and the esterification reaction was allowed to continue until water evolution slowed. Then 171 grams of water were added and the aqueous polyester was cooled and had oven solids of 86.8% and a Brookfield viscosity of 15,000.

EXAMPLE 4

Preparation of Polyester Resin (492D44)

To a glass reactor was added about 950 grams of maleic anhydride, which was heated to 150° C. to melt the maleic anhydride. About 1550 grams of pentaerythritol were added to provide a maleic anhydride:pentaerythritol mole ratio of 0.85:1. Once the pentaerythritol melted, the temperature was increased to about 200° C., all the time recovering and measuring the water evolved by the esterification reaction as distillate. Once about 87.2 grams of water (or about 80% of theoretical) were recovered, the reaction was considered complete and the polyester product was cooled. About 2500 grams of water were slowly added to the polyester to provide an aqueous resin with a solids content of about 50% and to prevent a rapid increase in viscosity.

EXAMPLE 5

Preparation of Polyamide Resin (2707)

Twenty-one and six-tenth parts of diethylenetriamine (DETA) were charged under anhydrous condition to a suitable reactor having an agitator and means for applying a vacuum and providing reflux. The agitator was started and about 30 parts of adipic acid (AA) was rapidly added (DETA:AA mole ratio of 1.02:1). The reaction was allowed to proceed at an elevated temperature not above 165° C. and the water evolved by the condensation reaction was collected and measured. The reaction was stopped after about 8 parts of water have evolved, which generally occurred in about 10 hours. At this point, the resin should exhibit a Gardner-Holt viscosity of about "BC" at 30–35% solids. With the reactor operating under reflux condition, about 43.6 parts of water were added. Then, the resin was cooled to 45° C. and additional water added, as needed, to yield a refractive index of from about 1.4305 to 1.4317. The final resin has a solids content of about 48%, a pH of about 10 and a Gardener-Holt viscosity of about "P-V".

EXAMPLE 6

Preparation of Polyamide Resin (471D96)

In a manner similar to that described in Example 5, diethylenetriamine (DETA) and adipic acid (AA) were reacted at a DETA:AA mole ratio of 0.97:1 using about 728.5 g of DETA and 1063.6 g of AA. The reaction was stopped after about 250 g of water had evolved (5 hours). The resin exhibited a Gardner-Holt viscosity of "AB" at 30–35% solids. Then about 1600 g of water were slowly added to yield a resin with solids content of about 50% and a refractive index of 1.4393 and a Gardner-Holt viscosity of S-T.

EXAMPLE 7

Preparation of Polyamide Resin (471D100)

Again, using the procedure of Examples 5 and 6, diethylenetriamine (DETA) and adipic acid (AA) were reacted at a mole ratio (DETA:AA) of about 1.33:1 using about 806 g of DETA and 856.3 g of AA. The reaction was continued until about 211 g of water had evolved (6.5 hours). About 1390 g of water was then slowly added to yield a resin having a solids content of about 50%, a pH of about 10.4 and a Gardner-Holt viscosity of "EE-F".

EXAMPLE 8

Preparation of Polyamide Resin (509D07)

Using the procedures of the previous examples, 722.4 g of diethylenetriamine (DETA) and 1054 g of adipic acid (AA) (DETA:AA mole ratio of 0.97:1) were reacted until about 216 g of water had evolved (6.0 hours). Then about 600 g of water were slowly added to the resin, followed by an additional 900 g of water previously used to rinse the reactor. The resin exhibited a refractive index of 1.4349 and a solids content of 49.6% and a Gardner-Holt viscosity of T-U.

EXAMPLE 9

Preparation of Polyester Resin (492D49)

To a glass reactor of a suitable capacity was added about 530 grams of maleic anhydride, which was heated to 150° C. to melt the maleic anhydride. About 470 grams of glycerine then were added to provide a maleic anhydride:glycerine mole ratio of 1:1. The temperature was increased to about 200° C. to facilitate the esterification reaction, all the time recovering and measuring the water evolved by the esterification reaction as distillate. Once about 94 of water were recovered, the reaction was completed to the desired extent and the polyester product was cooled. About 1000 grams of water was slowly added to the polyester to provide an aqueous resin solution having a solids content of about 50% and to prevent a rapid increase in solution viscosity.

EXAMPLE 10

Preparation of Polyester Resin (492D55)

To a glass reactor of a suitable capacity was added about 1057 grams of maleic anhydride and about 1443 g of glycerine, which were heated to 150° C. The reactants had a maleic anhydride:glycerine mole ratio of 0.65. The temperature was increased to about 190° C. to facilitate the esterification reaction, all the time recovering and measuring the water evolved by the esterification reaction as distillate. Near the end of the resin preparation, vacuum was applied to the reactor. Once about 194 g of water from the esterification reaction were recovered, the reaction was completed to the desired extent and the polyester product was cooled. About 2500 grams of water was slowly added to the polyester to provide an aqueous resin solution.

EXAMPLE 11

Preparation of Polyester Resin (492D56)

To a glass reactor of a suitable capacity was added about 1145.5 grams of maleic anhydride and 1354.5 g of glycerine which were heated to 150° C. The reactants had a maleic anhydride:glycerine mole ratio of 0.75:1. The temperature was increased to about 190° C. to facilitate the esterification reaction, all the time recovering and measuring the water evolved by the esterification reaction as distillate. Near the end of the resin preparation, vacuum was applied to the reactor. Once about 210 ml of water from the esterification reaction were recovered, the reaction was completed to the desired extent and the polyester product was cooled. About 2500 grams of water was slowly added to the polyester to provide an aqueous resin solution.

EXAMPLE 12

Curable Composition

In a vial containing 10 g. of polyamide based upon diethylenetriamine (DETA) and adipic acid (AA) with mole ratios of 1.02; 0.90 and 1.333 (all at 50% solids) respectively was added 10 g. of polyester resin (50% solids) (Example 1 which is based upon maleic anhydride and pentaerythritol at a mole ratio of 0.75. Each of these three mixtures were warmed to 32° to 34° C. to allow some reaction which occurs at this ester to amide weight ratio and which results in a pH of about 8–8.5. At the elevated pH, an addition reaction occurred at room temperature and built the binder molecular weight until the final product typically had a viscosity of Gardner-Holt "D-G" at a solids content of 50%. Each of these resins were cured at 150°-170° C. in an aluminum pan and all resins gelled except the 1.33 mole ratio polyamide and the unsaturated polyester. An aqueous caustic solution of pH 12 was added to each of the two cured resins and the cured resins were hydrolyzed into a liquid at room temperature which demonstrates hydrolizability and repulpability if used in making paper.

EXAMPLE 13

Curable Composition

To a sample of 20 g of a DETA-AA polyamide having a mole ratio of 1.02 was added 60 grams of water and 20 grams of the Example 1 polyester. This composition had 20% solids with an initial Gardner viscosity of A1A. The viscosity of the mixture did not increase even upon heating 40°-45° C. for 20-25 minutes.

EXAMPLE 14

Curable Composition

To about 100 g of the polyamide of Example 5 was added 100 g of the polyester of Example 1 yielding a solution having a pH of 8.1. On mixing, there was an initial exotherm of about 5°-6° C. and the reaction was allowed to proceed for about 3.5 hours until a Gardner-Holt viscosity of "Z1-Z2" was achieved. This reaction could be accelerated by warming to about 40°-45 ° C. Sufficient dilution water was added to give a 20% oven solids content. This composition, which had a Gardner-Holt viscosity of "D-E," was split into two portions. The first portion was adjusted to a pH of 6.8 and the second was left at a pH of about 8.2. After three (3) days storage, the sample at pH 6.8 had dropped in viscosity from "DE" to "AB" showing that hydrolysis had taken place. The second sample stored at pH 8.2 remained at substantially the same viscosity for over 2 weeks. This second sample was tested for gel time at 150° C. and it cured in 43 seconds. Water was added to the gelled resin and the resin swelled but did not break up. Then, dilute caustic water was poured onto the cured resin which was hydrolyzed into a liquid solution even at 150° C. curing conditions and remained a liquid at room temperature, albeit of high viscosity.

EXAMPLE 15-17

Preparation of Curable Compositions (506D49)

The polyester of Example 4 and the polyamide of Example 6 were combined to test the use of the resultant binder for glass fibers. The curable composition was prepared by mixing two (2) parts by weight of the polyester resin with one (1) part by weight of the polyamide. First, three separate portions of the polyester resin were treated with lactic acid to adjust the pH respectively to 4.5 (Example 15), 6.0 (Example 16) and 7.5 (Example 17). Then each pH-adjusted polyester was blended with the polyamide and the pH of the composition was adjusted to 7.0 using lactic acid or ethylene diamine as needed.

Dry and wet strength properties of the binder for binding glass were determined as follows for the three compositions. A 6-inch strip of glass roving (3 replicates for each composition) was impregnated with the curable composition (about 3-4% by weight), laid on a sheet of aluminum foil and the binder impregnated roving was spread to a uniform thickness. Each sample was dried in an oven at 90° C. for five minutes and then cured for 3-5 minutes in an oven at 200° C. A dry Modulus of Rupture (MOR) was determined using standard techniques. Then, each sample was immersed in boiling water for 10 minutes and a wet MOR was measured using the same standard procedure. The results are presented in Table 1.

TABLE 1

| Example | Initial Polyester pH | Dry MOR (psi) | Wet MOR (psi) |
|---------|---------------------|---------------|---------------|
| 15A | 4.5 | 4962 | 1141 |
| 15B | 4.5 | 4764 | 1320 |
| 15C | 4.5 | 4442 | 793 |
| 16A | 6 | 4603 | 999 |
| 16B | 6 | 6563 | 1169 |
| 16C | 6 | 6498 | 1198 |
| 17A | 7.5 | 7406 | 1346 |
| 17B | 7.5 | 9052 | 1150 |
| 17C | 7.5 | 8100 | 1664 |

EXAMPLES 18-19

Preparation of Curable Compositions (506D52)

Curable compositions were prepared by mixing two (2) parts of the polyester resin of Example 2 and one (1) part of the polyamide resin of Example 6. Two compositions were prepared, one with the polyester adjusted to a pH of 7.5 before blending with the polyamide and one with no pH adjustment. Each composition was adjusted to a pH of 7 before testing. The same dry and wet MOR tests reported in Examples 15-17 were performed. The results are presented in Table 2.

TABLE 2

| Example | Initial Polyester pH | Dry MOR (psi) | Wet MOR (psi) |
|---------|---------------------|---------------|---------------|
| 18A | 7.5 | 4667 | 759 |
| 18B | 7.5 | 6210 | 1280 |
| 18C | 7.5 | 2935 | 930 |
| 19A | 2.0 | 8358 | 1342 |
| 19B | 2.0 | 8945 | 1149 |
| 19C | 2.0 | 9554 | 1037 |

EXAMPLE 20

Preparation of Curable Composition (506D54)

A curable composition was prepared by mixing two (2) parts by weight of the polyester of Example 9 with one (1) part by weight of the polyamide of Example 6. The composition was adjusted to a pH of 7.0. Dry and wet MOR's were determined and the results are presented in Table 3, where they can be contrasted with the results of Example 19.

TABLE 3

| Example | Dry MOR (psi) | Wet MOR (psi) |
|---------|---------------|---------------|
| 20A | 8577 | 1047 |
| 20B | 6382 | 1119 |
| 20C | 8174 | 1255 |
| 19A | 8358 | 1342 |
| 19B | 8945 | 1149 |
| 19C | 9554 | 1037 |

EXAMPLE 21-23

Preparation of Curable Compositions (506D63)

Curable compositions were prepared by mixing the polyester of Example 10 with the polyamide of Example 7. Three compositions were prepared. One with one (1) part polyester and with two (2) parts polyamide, one with equal parts polyester and polyamide and one with two (2) parts polyester and one part polyamide. No pH adjustment was made before testing. Dry and wet MOR results are reported in Table 4. Five (5) replicates were prepared and tested for each composition.

TABLE 4

| Example | Ester:Amide Weight Ratio | Composition pH | Dry MOR (psi) | Wet MOR (psi) |
|---|---|---|---|---|
| 21A | 1:2 | 9.1 | 5745 | 1254 |
| 21B | 1:2 | 9.1 | 5558 | 1040 |
| 21C | 1:2 | 9.1 | 6396 | 1412 |
| 21D | 1:2 | 9.5 | 8002 | 1176 |
| 21E | 1:2 | 9.5 | 12466 | 1540 |
| 21F | 1:2 | 9.5 | 13033 | 1768 |
| 22A | 1:1 | 8.3 | 6706 | 1688 |
| 22B | 1:1 | 8.3 | 8389 | 1471 |
| 22C | 1:1 | 8.3 | 4922 | 1383 |
| 22D | 1:1 | 9.2 | 11954 | 1460 |
| 22E | 1:1 | 9.2 | 11376 | 1864 |
| 22F | 1:1 | 9.2 | 5412 | 1011 |
| 23A | 2:1 | 7.7 | 4800 | 1966 |
| 23B | 2:1 | 7.7 | 7271 | 2037 |
| 23C | 2:1 | 7.7 | 11941 | 2973 |
| 23D | 2:1 | 7.7 | 7100 | 2384 |
| 23E | 2:1 | 7.8 | 11630 | 1633 |
| 23F | 2:1 | 7.8 | 7483 | 2038 |

Although certain embodiment of the invention have been described in detail, it will be appreciated that other embodiments are contemplated along with modifications of the disclosed features, as being within the scope of the invention, which is defined in the appended claims.

For example, water-dilutable and especially water soluble compositions of the present invention are particularly suitable for producing non-woven fiber mats which are typically manufactured by a process known as the "wet" process. This process is well known in the art, as typified by the disclosure in U.S. Pat. No. 4,129,674 which is incorporated herein by reference.

A typical wet process may be briefly summarized as follows: fibers are dispersed in an aqueous slurry through a combination of mechanical agitation and chemical dispersants. A continuous fine mesh conveyor, known in the industry as a forming wire, passes through the slurry and is thereby coated with an even, continuous layer of fibers. The fibers are randomly deposited on the wire, forming a non-woven web or membrane. Most of the water passes through the wire. Excess water is removed from the mat by conventional methods, typically by vacuum. The web is transferred to a second screen conveyor for conveyance through a section of the processing line where it is saturated with a chemical binder. The binder-saturated web is then passed through an oven, which cures the binder and evaporates most of the remaining water. This results in the formation of a continuous dry mat. The mat is then wound upon a spool for further processing.

Inorganic fibers are commonly used in such fiber mats. Glass fibers, mineral wool and carbon fibers are examples of such inorganic fibers. Further, fibers of various sizes may be blended together to form the mat. See, for example, U.S. Pat. No. 4,637,951 to Gill et al. and U.S. Pat. No. 4,129,674 to Hannes et al also incorporated herein by reference. It is also known that mineral wool may be partially or wholly substituted for glass wool (i.e. glass fibers) in a blended mat. See, for example U.S. Pat. No. 4,532,006 to Winters et al. also incorporated herein by reference. Ultimately, the fibers in the wet process mat are bonded to each other using the chemical binder. In accordance with the present invention, the fibers are bonded together by applying and curing the thermosetting composition of the present invention. The binder may also contain filler materials such as clay and gypsum among others. See U.S. Pa. No. 5,001,005 to Blanpied which is incorporated herein by reference.

We claim:

1. A thermosetting composition comprising a combination of an unsaturated polyester resin and a polyamino compound having a plurality of secondary or primary amino moieties.

2. The composition of claim 1 wherein the polyamino compound has a molecular weight of at least about 150 with a formula:

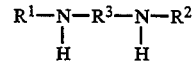

wherein $R^1$ and $R^2$ are independently selected from the group consisting of hydrogen, and aliphatic, cycloaliphatic and aromatic hydrocarbon radicals; and $R^3$ is a divalent organic radical selected from the group consisting of alkylene, ether-linked alkylene, ether-linked cycloalkylene, ether-linked arylene, amino-linked alkylene, amino-linked cycloalkylene, amino-linked arylene and combinations thereof.

3. The composition of claim 2 wherein the unsaturated polyester resin comprises a reaction product of an ethylenically unsaturated carboxylic acid or anhydride thereof having a carboxyl functionality of at least 2 with an organic polyol having a hydroxyl functionality of at least 3.

4. The composition of claim 3 wherein said ethylenically unsaturated carboxylic acid or anhydride thereof and said organic polyol are present in an amount to provide an equivalent mole ratio of hydroxyl moieties to carboxyl moieties of at least about 1.

5. The composition of claim 4 wherein said ethylenically unsaturated carboxylic acid or anhydride thereof is selected from the group consisting of maleic acid, fumaric acid, maleic anhydride and mixtures thereof.

6. The composition of claim 5 wherein said organic polyol is selected from the group consisting of trimethylolethane, trimethylolpropane, glycerol, pentaerythritol, sorbitol, 1,2,6-hexanetriol, triethanolamine and mixtures thereof.

7. The composition of claim 3 wherein said polyamino compound is a polyamide resin having a molecular weight of at least about 300 comprising a reaction product of a dicarboxylic acid or a reactive derivative thereof with an organic polyamine.

8. The composition of claim 7 wherein said dicarboxylic acid is an saturated aliphatic acid selected from the group consisting of malonic acid, succinic acid, glutaric acid, adipic acid and mixtures thereof.

9. The composition of claim 8 wherein the organic polyamine has the formula:

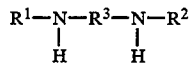

wherein $R^1$ and $R^2$ are independently selected from the group consisting of hydrogen, or aliphatic, cycloaliphatic and aromatic hydrocarbon radicals, or $R^1$ and $R^2$ taken together form a cycloaliphatic ring, the hydrocarbon radicals or ring compound containing a primary or secondary amino moiety; and $R^3$ is a covalent bond or a divalent organic radical selected from the group consisting of alkylene, cycloalkylene, arylene, ether-linked alkylene, ether-linked cycloalkylene, ether-linked arylene, amino-linked alkylene, amino-linked cycloalkylene, amino-linked arylene and combinations thereof.

10. The composition of claim 9 wherein said organic polyamine is selected from the group consisting of ethylene diamine, propylene diamine, hexane-1,6-aliamine, 4,4'-methylene bis(cyclohexylamine), aminoethylpiperazine, diethylenetriamine, triethylenetetramine, tetraethylenepentamine, 3,3'-iminobispropylamine, polyethylene polyamines, polypropylene polyamines, and polybutylene polyamines.

11. The composition of claim 4 wherein said equivalent mole ratio of hydroxyl moieties to carboxyl moieties is at least about 2.

12. The composition of claim 4 wherein said equivalent mole ratio of hydroxyl moieties to carboxyl moieties is between about 1.2 and 5.0.

13. A water dilutable, thermosetting composition comprising a combination of an unsaturated polyester resin having free hydroxyl moieties and a water-dilutable polyamino compound having a plurality of secondary or primary amino moieties.

14. The composition of claim 13 wherein the unsaturated polyester resin comprises a reaction product of an ethylenically unsaturated carboxylic acid or anhydride thereof having a carboxyl functionality of at least 2 with an organic polyol having a hydroxyl functionality of at least 3.

15. The composition of claim 14 wherein said ethylenically unsaturated carboxylic acid or anhydride thereof and said organic polyol are present in an amount to provide an equivalent mole ratio of hydroxyl moieties to carboxyl moieties of at least about 1.

16. The composition of claim 15 wherein said polyamino compound is a polyamide resin having a molecular weight of at least 300 and comprising a reaction product of a dicarboxylic acid or a reactive derivative thereof with an organic polyamine.

17. The composition of claim 15 wherein said equivalent mole ratio of hydroxyl moieties to carboxyl moieties is between about 1.2 and 5.0.

18. The composition of claim 17 wherein said dicarboxylic acid is an saturated aliphatic acid selected from the group consisting of malonic acid, succinic acid, glutaric acid, adipic acid and mixtures thereof.

19. The composition of claim 18 wherein said organic polyamine is selected from the group consisting of ethylene diamine, propylene diamine, hexane- 1,6-diamine, 4,4 '-methylene bis(cyclohexylamine), aminoethylpiperazine, diethylenetriamine, triethylenetetramine, tetraethylenepentamine, iminobispropylamine, polyethylene polyamines, polypropylene polyamines, and polybutylene polyamines.

20. A mat of fibers bound together with a thermosetting composition comprising a combination of an unsaturated polyester resin and a polyamino compound having a plurality of secondary or primary amino moieties.

21. A thermosetting composition comprising a mixture of an unsaturated polyester resin having free hydroxyl moieties and a polyamino compound having a plurality of secondary or primary amino moieties, wherein said polyamino compound has a molecular weight above about 300.

* * * * *

UNITED STATES PATENT AND TRADEMARK OFFICE
CERTIFICATE OF CORRECTION

PATENT NO. : 5,393,849
DATED : February 28, 1995
INVENTOR(S) : Ramji Srinivasan, Ted M. McVay, and David A. Hutchings It is certified that error appears in the above-indentified patent and that said Letters Patent is hereby corrected as shown below:

In column 1, line 44, change "aliamines" to --diamines--.

Column 19,

In line 3 of claim 10, change "hexane-1,6-aliamine" to --hexane-1,6-diamine--.

Column 20,

In line 1 of claim 18, delete "17" and insert therefor --16--.

Signed and Sealed this

Sixth Day of June, 1995

Attest:

BRUCE LEHMAN

Attesting Officer          Commissioner of Patents and Trademarks